3,022,216
SEED DISINFECTION

Antje Kaars Sijpesteijn, Utrecht, Netherlands, assignor to The Nederlandse Centrale Organisatie voor Toegepast-Natuurwetenschappelijk Onderzoek, The Hague, Netherlands, a corporation of the Netherlands
No Drawing. Filed Nov. 5, 1958, Ser. No. 771,961
Claims priority, application Netherlands Nov. 8, 1957
4 Claims. (Cl. 167—38)

The invention relates to a process for treating seeds by means of disinfectants with depth effect, and to the seeds thus treated.

It is known in the field of art that a few antibiotic substances can be used for this purpose (internal seed-disinfection), when these:

(a) Have a bactericidal and/or fungicidal effect,
(b) Exert a systemic action on the seed, i.e. show a depth effect in the seed, and
(c) Are not phytotoxic in the concentrations required for the disinfection of the seeds.

The chlorinated quinones and mercury compounds frequently used for disinfecting seeds do not show any depth effect (systemic action) neither does tetramethylthiuram disulfide (T.M.T.D.), i.e. the said substances are only effective with regard to fungi or bacteria which are present on the surface of the seeds.

So far no synthetic substance has been known, which could be applied as a seed-disinfectant with depth effect. The antibiotic substances referred to above are not yet commercially available, in any case, they are still too expensive for the time being.

It is an object of the invention to provide for a seed disinfectant which will meet the above-mentioned conditions a, b and c and the active substance of which can be synthetically produced by purely chemical reactions.

Another object is to provide for a systemic seed disinfectant which will be active to internal infection of seeds of dicotyledones plants, more in particular, which will be active against *Ascochyta pisi* in peas.

Further objects of the invention will appear from the description below.

In general, my invention consists in the application of a seed-treating composition of which 2-pyridinethiol-N-oxide is the active substance. The said compound will hereinafter be designated as P.T.O. Also, a derivative of P.T.O. can be used as active substance, which is converted into P.T.O. under physiological conditions that is, under the conditions of use, in or on the seeds. Examples of such derivatives, which can advantageously be used, are the hydrohalide salts, such as the HBr and HCl salts, of 2-isothioureum pyridine-N-oxide.

P.T.O. as well as the said 2-thioureum derivative are already known per se. The fungicidal properties of P.T.O. have been described too. However, the depth effect or systemic action of P.T.O. as a seed-disinfectant in particular for dicotyledones seeds is surprising, because it has been generally supposed up till now that its fungicidal effect is brought about by a metal compound such as the complex copper-compound of P.T.O. This copper-compound in itself does not show a depth effect similar to that of P.T.O. in the free state. In addition to this, in fungicidal substances with a related behaviour, such as 8-oxiquinoline, in which the metal-compound also is the active agent, neither the metal-compound nor the free 8-oxiquinoline show any depth effect, i.e. neither of them are active against internal infection in seeds.

The active compound can be mixed with the seeds in the form of a finely divided powder which may consist of a technical grade of the active compound, however, it may also be diluted with a solid inert diluent such as talcum powder; it can be used as a dilute aqueous solution containing the active compound in an amount of between 5 and 500 parts by weight per million. Also the disinfectant can be used in the form of a more concentrated slurry comprising the powdery active compounds in the appropriate quantity, an adhering agent such as carboxymethyl cellulose (C.M.C.) or the like and enough water to moisten the quantity of seeds to be treated whereby the concentration of the active compound in the slurry is between 1 and 35 percent by weight, and preferably between about 5 to 15 percent by weight and the adhesive between about 5 and 30 percent and preferably between about 10 and 20 percent.

However, other adjuvants which are usual in this field of art may be added too.

P.T.O. can successfully be applied to the seeds of various leguminous plants such as peas and beans, and further to the seeds of beetroot, radish, carrots, etc.

EXPERIMENTS ON PEAS

Example 1

A filter-paper test was carried out with seeds of the breed of peas "Eminent" attacked by Ascochyta. The seeds were soaked in an aqueous P.T.O. solution of 200 p.p.m. (parts by weight per million) for 24 hours.

By way of check-up another lot was soaked in water for 24 hours. In each dish 50 seeds were present.

When the dishes that had been treated were examined as to the presence of *Ascochyta pisi* the following results were obtained as regards the number of diseased seeds.

P.T.O. 1st dish: 0
P.T.O. 2nd dish: 2
Water: 37

For the methodology used reference is made to the thesis of Dr. J. Dekker (Wageningen, 1957).

It is remarked that according to "De Tuinbouwgids" (Guide to Gardening) of 1957 (Wageningen) no means of combating *Ascochyta pisi* exists up till now.

Example 2

Pea-seeds of the breed "Eminent" attacked by Ascochyta were soaked in solutions containing 0, 10, 25 and 100 p.p.m. of P.T.O. respectively for 24 hours.

Examination as to *Ascochyta pisi*; 25 seeds to each object.

| Concentration | 0 p.p.m. | 10 p.p.m. | 25 p.p.m. | 100 p.p.m. |
|---|---|---|---|---|
| Number of diseased seeds | 17 | 3 | 1 | 1 |

The conclusion to be drawn from this filter-paper test is, that the percentage of seeds attacked by *Ascochyta pisi* can be reduced from appr. 70% to appr. 4% by soaking in P.T.O. Moreover, little or no inhibition is exerted on germination.

Example 3

*Underground tests.*—Seeds of the breed "Eminent" were soaked in a solution of 0, 10, 25, 50, 100 and 200 p.p.m. of P.T.O. for 24 hours.

200 seeds were used to each concentration. The germination results of the various groups were as follows. The test was carried out with seeds attacked by *Ascochyta pisi.*

|  | 0 p.p.m. | 10 p.p.m. | 25 p.p.m. | 50 p.p.m. | 100 p.p.m. | 200 p.p.m. |
|---|---|---|---|---|---|---|
| Germination after 6 days | 164 | 155 | 163 | 167 | 155 | 144 |
| Germination after 13 days | 196 | 193 | 192 | 198 | 194 | 191 |
| Diseased | 20 | 9 | 3 | 3 | 2 | 1 |

A similar test was carried out with healthy seeds and 100 seeds to each object.

|  | 0 p.p.m. | 10 p.p.m. | 25 p.p.m. | 50 p.p.m. | 100 p.p.m. | 200 p.p.m. |
|---|---|---|---|---|---|---|
| Germination after 6 days | 83 | 83 | 84 | 75 | 78 | 80 |
| Germination after 13 days | 94 | 94 | 92 | 94 | 93 | 93 |

Example 4

For purposes of comparison a test was carried out with the antibiotic substance rimocidine.

200 seeds to each object, breed "Eminent," attacked by *Ascochyta pisi;* seeds being soaked in an aqueous solution for 24 hours.

| Germination after | 5 days | 7 days | 11 days | Diseased |
|---|---|---|---|---|
| $H_2O$ | 124 | 158 | 163 | 31 |
| P.T.O., 100 p.p.m. | 129 | 161 | 178 | 0 |
| Rimocidine, 75 p.p.m. | 98 | 152 | 156 | 0 |
| P.T.O., 100+Rim. 75 | 95 | 150 | 164 | 0 |
| P.T.O. slurry [1] | 143 | 177 | 187 | 5 |

[1] Slurry, per 200 seeds: 200 mg. of P.T.O., 80 mg. of C.M.C. (carboxy methyl cellulose) and 0.8 cm.$^3$ of $H_2O$.

Example 5

Slurry-test with healthy seeds (breed "Rondo") and diseased seeds (breed "Eminent"), 200 seeds per object: composition of slurry as in Example 4.

| Germination after | 7 days | 12 days | Diseased |
|---|---|---|---|
| Eminent, blank | 112 | 121 | 34 |
| Eminent, P.T.O. slurry | 122 | 140 | 2 |
| Rondo, blank | 129 | 133 | |
| Rondo, P.T.O. slurry | 129 | 149 | |

The conclusion can be made, that by using P.T.O. the percentage of diseased plants can be reduced from 10–15 to 0–3%. Treatment with slurry causes a better germination and a better development of the plant with healthy as well as with diseased pea-seeds.

P.T.O. penetrates through the seed-skin into the cotyledon and into the germ and thus shows depth effect.

Example 6

*Underground tests with bean-seeds.*—75 beans were treated per object. On 80 seeds 92 mg. of P.T.O., 40 mg. of carboxy methyl cellulose and 0.4 cm.$^3$ of water were used.

The results were judged of by the number of plants that had come up and by the number of plants that had been attacked.

| Coming up after | 7 days | 12 days |
|---|---|---|
| Slurry without P.T.O. | 42 | 53 |
| Slurry with P.T.O. | 0 | 54 |

| Number of diseased plants after | 7 days | 12 days |
|---|---|---|
| Slurry without P.T.O. | 11 | 39 |
| Slurry with P.T.O. | 0 | 2 |

Here, too, P.T.O. evidently causes a considerable reduction of the number of diseased plants. The slight retardation of germination at the start is quickly neutralised.

Example 7

Beetroot-seeds were treated with 8 g. of P.T.O. powder per kg. and checked up by the filter-paper test. Of 100 seeds that had not been treated 64 had been attacked, whilst of the 100 seeds that had been treated 9 appeared to have been attacked.

Example 8

*Tests with peas attacked by* Ascochyta pisi.—200 seeds to each object, sown out in pre-steamed soil. Per 200 seeds a slurry containing 200 mg. of P.T.O., 33 mg. of C.M.C. and 1.33 cm.$^3$ of $H_2O$ was applied.

For the sake of comparison some seeds were also treated with "Germisan" (an organic mercury-compound) and T.M.T.D., 100 mg. per 200 seeds.

Examination of the number of diseased plants after 18 days:

Not treated _____ 39
Germisan _____ 19
T.M.T.D. _____ 12
P.T.O. slurry _____ 1

Analogous tests with oxyquinoline showed an only moderate decrease in the number of diseased plants even when 1000 p.p.m. were applied. From this it is evident that oxyquinoline does not penetrate into the seed.

Example 9

Tests with carrot-seeds, attacked by *Stemphylium radicinum,* 200 seeds to each object.

The seeds were soaked in 100 p.p.m. of P.T.O.+1% of a surface active substance ("Tween 20") in groups of 200 seeds for 2 hours. After 3 weeks the result of the filter-paper test was examined.

The results were:
Percent
Not treated _____ 69
P.T.O. _____ 2

Which shows that here, too, a good effect was obtained.

Example 10

Diseased pea-seeds (breed "Eminent") soaked in 50, 100 and 200 p.p.m. pyridyl-N-oxide-2-isothioureumhydrobromide or in water for 24 hours.

Examinations as to *Ascochyta pisi* after 6 days. 50 seeds to each object.

|  | Water | 50 p.p.m. | 100 p.p.m. | 200 p.p.m. |
|---|---|---|---|---|
| Diseased | 21 | 1 | 0 | 0 |

I claim:
1. A process for combating internal infection in seeds of dicotyledones plants wherein said seeds are treated with a disinfectant containing as active compound a sub- stance selected from the group consisting of 2-pyridine thiol-N-oxide and 2 isothioureum pyridine-N-oxide-hydrohalide.

2. A process as claimed in claim 1 wherein the disinfectant composition is an aqueous slurry of the said active compound in a concentration of between 5 and 35 percent by weight, which also comprises an adhering agent in a concentration of between 5 and 30 percent by weight.

3. A process for combating internal infection in seeds of dicotyledones plants wherein said seeds are treated with a disinfectant composition comprising a diluted aqueous solution of a substance, selected from the group consisting of 2-pyridinethiol-N-oxide and 2 isothioureum pyridine-N-oxide hydrohalide in a concentration of between 5 and 500 parts by weight per million.

4. A process for combating the internal infection in seeds of dicotyledones plants wherein said seeds are treated with a powdery disinfectant consisting substantially of the compound selected from 2-pyridinethiol-N-oxide and 2 isothioureum pyridine-N-oxide hydrohalide and mixtures thereof.

References Cited in the file of this patent

UNITED STATES PATENTS

| 2,429,096 | Ladd | Oct. 14, 1947 |
| 2,686,786 | Shaw et al. | Aug. 17, 1954 |
| 2,809,971 | Bernstein et al. | Oct. 15, 1957 |
| 2,909,459 | Hovey | Oct. 20, 1959 |

OTHER REFERENCES

Kaars Sijpesteijn, Effect of Copper and Chelating Agents on Growth Inhibition of Aspergillus niger by 8-hydroxy quinoline and Pyridine-N-Oxide-2-Thiol, Nature, pp. 505–6, September 7, 1957.

Dekker et al., Nature vol. 181, No. 4616, p. 1017, Apr. 5, 1958.